July 14, 1970          C. C. HACH          3,520,626
COLOR WHEEL FOR COLOR COMPARATORS
Filed Feb. 10, 1966          2 Sheets-Sheet 1
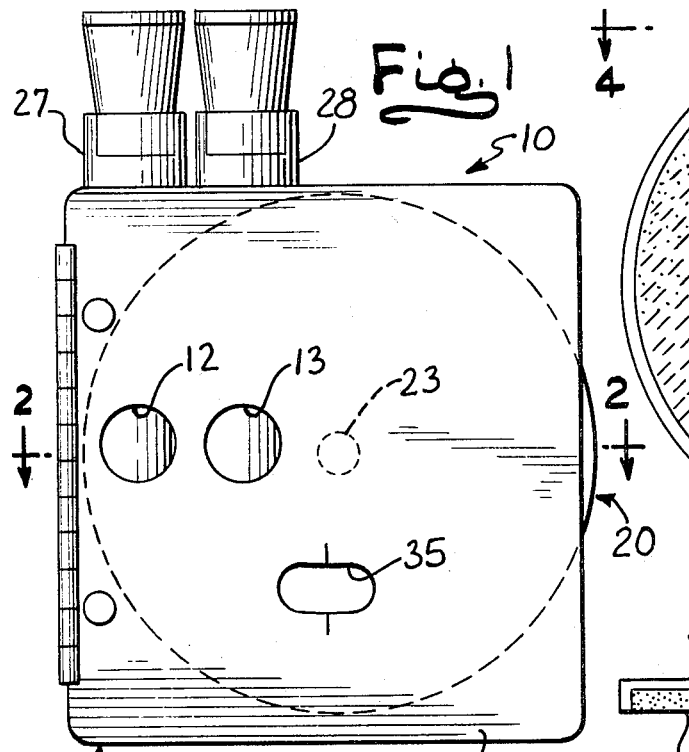
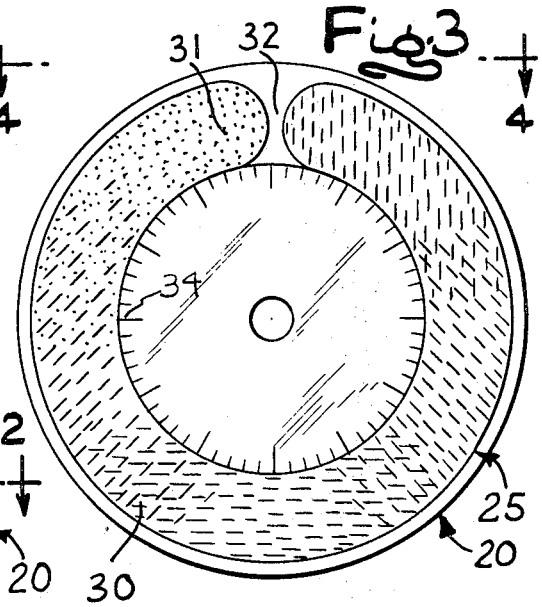
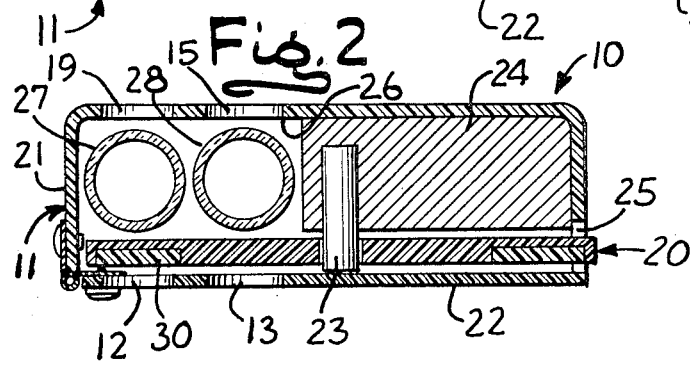
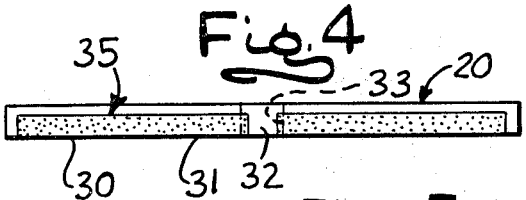
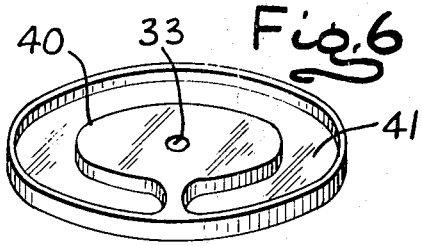
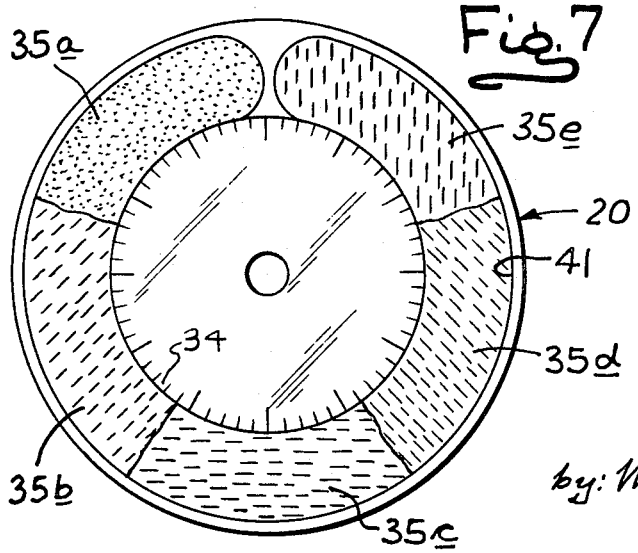
INVENTOR
CLIFFORD C. HACH
by: Wolfe, Hubbard, Voit & Osann
ATTYS.

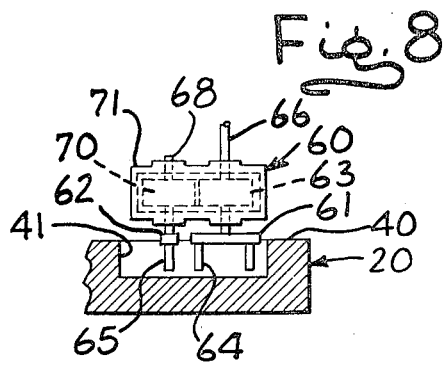
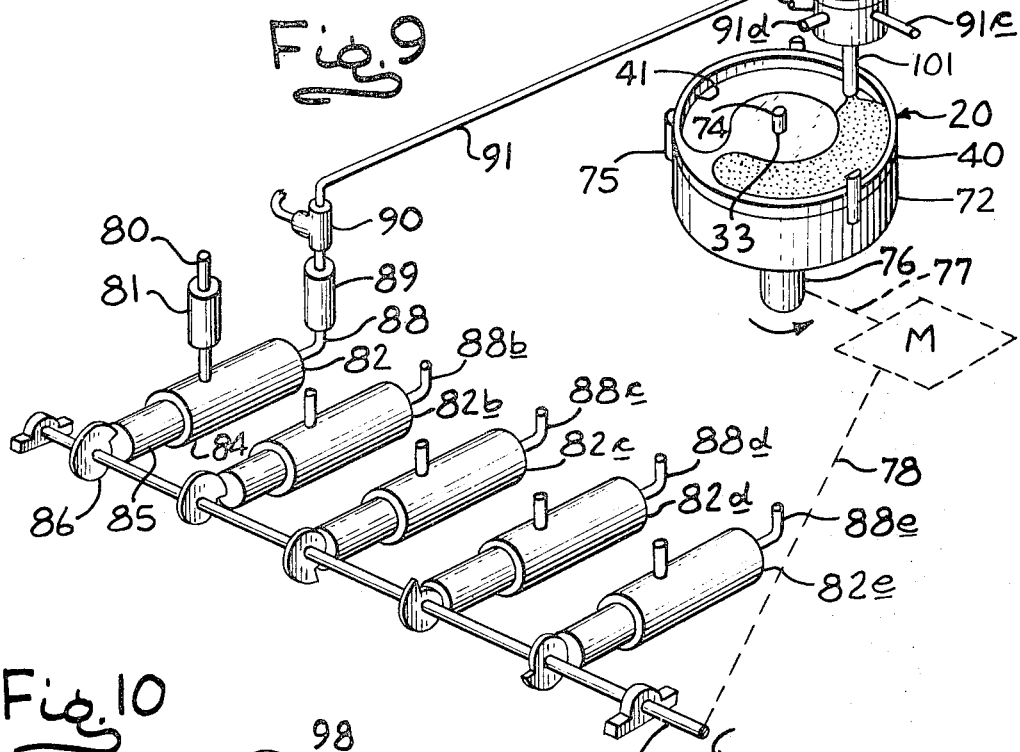
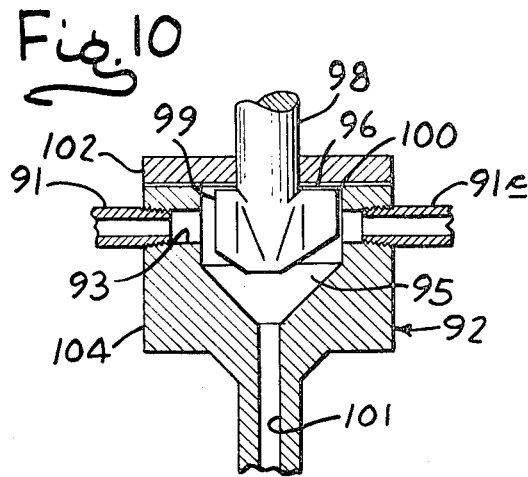

Untied States Patent Office 3,520,626
Patented July 14, 1970

3,520,626
COLOR WHEEL FOR COLOR COMPARATORS
Clifford C. Hach, Ames, Iowa, assignor to Hach Chemical Company, Ames, Iowa, a corporation of Iowa
Filed Feb. 10, 1966, Ser. No. 526,532
Int. Cl. G01j 1/02
U.S. Cl. 356—243
9 Claims

ABSTRACT OF THE DISCLOSURE

A transparent color-comparator standard comprises a body of transparent material having a flat-bottomed constant depth groove of uniform width, containing an integral strip of hardened transparent resin having a color, hue, value, and/or chroma that varies continuously along the groove.

This invention relates to color comparators for evaluating samples taken for chemical testing, and more particularly concerns an improved color standard for such comparators. The invention is particularly, although not exclusively, concerned with providing improved color standards for pH meters of the color comparator type.

Color comparator type pH meters are those intended to give the user a manual "reading" of the pH of a liquid sample by comparing the color of a sample containing a soluble organic dye or "indicator" with the color of a known standard. The color of the indicator depends on the pH, or negative logarithm of the hydrogen ion concentration in the sample.

A typical comparator pH meter receives a pair of test tubes or cells and a color standard is arranged to bring various light transmitting, color shaded "windows" adjacent one of the tubes. The sample under test is placed into both tubes and the pH indicator added to only the tube that is not seen through the colored window. The standard is then manipulated until it appears that both solutions have the same color, and the windows or portions of the color standard required to equalize the colors gives a known measure of the color produced by the indicator, that is, the pH of the sample.

Color standards often take the form of wheels having peripherally spaced windows colored so that adjacent windows define adjacent steps of the scale used to compare against the test sample and indicator. Such wheels have been expensive to manufacture, since each window requires accurate and different tinting, and the wheels are capable of giving only range approximations between the steps established by the separate windows. Recently, color standards have become available that use a band of continuously graded color. While these avoid stepwise comparison and interpolation characteristic of a series of windows, they have generally been available in gradations of a single color, or at most, of two colors. Although these are quite satisfactory for the colorimetric determination of unknown concentrations other than pH (where generally only one color is involved), they are of limited usefulness in pH meters for the reason that most indicator dyes change color only over a rather narrow range of pH. Consequently, one-color or two-color continuously graded color standards for pH measurement are only useful over the usable range of a single indicator or, at most, for the range of two indicators.

Accordingly, a primary object of the invention is to provide a continuously graded color comparator standard useful for a wide range of pH measurements. A related object is to provide such standards for use in conjunction with two, three, or even more different indicators.

Still another object is to provide a transparent color comparator standard having a band of continuously graded color which varies continuously, and in any predetermined manner, with respect to hue, value, and/or chroma. Yet another object is to provide such standard in which any number of different hues, values, and/or chromae may be present.

Yet another object is to provide a color comparator standard which is easily manufacture, simple and accurate to use, and stable over long periods of time.

A further object is to provide a versatile color comparator standard which is not limited to two different hues.

An overall object is to provide novel methods of making such standards.

Other objects and advantages of the invention will become apparent from the following detailed description, which is to be read in conjunction with the attached drawings in which:

FIG. 1 is an elevation of a pH meter of the color comparator type embodying the invention;

FIG. 2 is a section taken approximately along the line 2—2 in FIG. 1;

FIG. 3 is an enlarged elevation of the color standard wheel used in the device of FIGS. 1 and 2;

FIG. 4 is an end view taken approximately along the line 4—4 in FIG. 3;

FIG. 5 is a perspective of a blank used to manufacture the wheel of FIG. 3;

FIG. 6 shows the blank of FIG. 5 after forming a peripheral flat-bottomed constant-depth groove of uniform width therein;

FIG. 7 is an enlarged elevation showing a step in one form of the manufacturing process;

FIG. 8 is an enlarged sectional elevation of an apparatus used in the manufacturing process of FIG. 7;

FIG. 9 is an alternative apparatus used in an alternative method of making the color comparator standard; and FIG. 10 is an enlarged elevation of one part of the apparatus shown in FIG. 9.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning first to FIG. 1, there is shown a color comparator 10 embodying the invention and comprising a frame 11, having pairs of viewing apertures 12 and 13, and 14 and 15, and a color comparator in the form of a circular disk or wheel 20. In the illustrated construction, the frame 11 includes a box-like container 21, in which the apertures 15, 19 are formed, and a hinged front door 22, having the apertures 12, 13 alined with the apertures 15, 19. The color comparator wheel 20 is freely pivoted on a post 23, mounted in a block 24 fixed within the frame 11, so that the wheel extends laterally through a slot 25 in the side of the frame box 21. The protruding edge of the wheel 20 makes it possible to rotate the wheel with the box-like frame closed and, by swinging upon the door 22, the color comparator wheel 20 can easily be lifted from the post 23 and an alternate wheel substituted.

The comparator 10 is also formed with an open topped well 26 adapted to receive in side-by-side relation a pair of fluid containing cells taking the form of test tubes 27 and 28.

Pursuant to the invention, the color wheel 20 is formed of transparent material and includes an integral peripheral tinted band 30 of continuously and smoothly varying color. The color will vary, depending on the requirements of the analysis, with respect to hue, value and/or chroma, these terms being more fully defined in Kirk & Othmer's "Encyclopedia of Chemical Technology," second edition, volume 5, pages 801 through 812, in the section entitled Color Measurement. A particular feature of the invention is that band 30 may have increments of two, three, or even more different hues, different values of any one or more of each hue, and different chroma of each combination of hue and value. In other words, the color comparator of the invention is not limited to only one or two different hues, or to different values of chromae of a single hue.

Accordingly, in a color comparator standard used for wide range pH measurement, the band 30 will vary gradually from red at one extremity 31 of band 30 corresponding to a pH of 4, through orange corresponding to pH 5, yellow for pH 6, pea green for pH 7, blue at pH 8, darker blue at pH 9, and violet at pH 10. These hues, with all their nuances of value and chroma, correspond to a wide range, three component, organic indicator dye composed of methyl red (red at pH 4.2, yellow at pH 6.4), brome thymol blue (yellow at pH 6, blue at a pH of about 8), and phenolphthalein (colorless at pH 8.3, pink at pH 10).

The wheel 20 also includes a central hole 33, adapted to fit easily over the comparator post 23 (FIG. 1), and a scale 34 running along the band 30 whose indicia may be viewed through an aperture 35 (FIG. 1) formed in the door 22 of comparator 10. These indicia correspond with a predetermined color relationship between the color on any point of band 30 and the concentration of unknown in the sample undergoing test. An approximate calibration may be accomplished by appropriate design of color wheel 20 and appropriate formulation of colored material in band 30, as will appear hereinafter, or may be made more exact by calibration against solutions of known composition.

To operate the comparator 10, a fixed amount of the solution to be tested is placed in each of cells or tubes 27 and 28, and an indicator is added only to tube 28. For a wide range pH measurement, a mixture of pH indicators is used. The indicator produces a color change in the solution in tube 28, with the hue, value, and chroma being dependent on the composition of the original test solution in tube 28 and on the amount and composition of indicator. Since indicator concentration is held constant from test to test, the principal color variable will be its hue, while value and chroma will be relatively unaffected.

The comparator 10 is then held to the light so that the user can view apertures 12 and 13 (FIG. 1). The color seen through aperture 13 (and aperture 15 in FIG. 2) has a hue which is dependent on the pH of the test sample contained in tube 28. That portion of wheel 20 between apertures 13 and 15 is completely transparent.

Color wheel 20 is provided with a tinted band 30 having variations in hue, value, and chroma appropriate for the particular indicator being used. Hence the color seen through the apertures 12 and 19 (FIG. 2) is that of a small portion of the peripheral color band 30 as modified by light passing through the tube 27 which contains the sample under test but without a pH indicator added.

The wheel 20 is then turned by manipulating the projecting portion at the right-hand side of the comparator 10 until, to the observer, the color appears identical at the apertures 12, 13. The angular position of the wheel when this occurs is thus indicative of the point along the color band 30 which matches the extent of the color change in the tube 28. Thus, by standardizing the color band of the wheel 20, a reading of the scale 34 through the aperture 35 gives a direct indication of the pH in the sample under test. It will be appreciated that the factors affecting the color seen at the apertures 12, 13 are identical except that the color at the aperture 12 is affected by light transmitted through the color band 30 and the color seen at the aperture 13 is affected by light transmitted through the pH indicator containing solution in the tube 28.

Referring to FIGS. 3 and 4, the color wheel 20 is a transparent body in the shape of a flat disk (FIG. 5) having an integral band or strip 30 of smoothly and continuously varying hue, value, and/or chroma. Strip 30 is annular, extending about the periphery of the wheel 20 for substantially all of its circumference, and it is of a substantially uniform width measured radially of the wheel.

As may best be seen with reference to FIG. 6, the band or strip 30 occupies, and is defined by, an annular groove 41 that has a flat bottom, is of constant depth, and is of uniform width. The material making up the strip 35 is carefully prepared in accordance with the invention so that it presents smoothly varying changes in hue, value, and/or chroma as the strip is viewed perpendicularly through the plane of the wheel 20.

In making a transparent color comparator standard, a blank 40 (FIG. 5) of a transparent organic resin is first cut to the desired shape, and a central pivot hole 33 is drilled therein. Thereafter, an annular groove 41 (FIG. 6) is milled in blank 40 to a constant depth and width, and the bottom surface of groove 41 is polished flat and smooth. Alternatively, groove 41 may be formed in the disk or blank 40 by casting the blank in a mold having a shape corresponding to groove 41. Similarly, pivot hole 33 may be formed during the molding operation.

The colored strip 35 may advantageously be formed by either of two methods, both to be described hereinafter. Broadly, in the first method two or more batches of a viscous, hardenable, transparent organic resin, each tinted to an appropriate predetermined color (i.e., combination of hue, value, and/or chroma) are prepared, and an increment of each resin is deposited in a portion of groove 41. The increments are thereafter carefully mixed by a mixer that moves longitudinally along groove 41 so as to form a strip of smoothly and constantly varying color. The resin in strip 35 is thereafter hardened, and is shaped, as for example by planing, and polishing.

In the second method, two or more different colored resins are prepared in the manner of the first method, but instead of depositing increments of each separate resin in groove 41 the different resins are pumped as continuous streams, with the separate streams being blended in continuously varying proportions, so as to produce a single mixed stream of continuously varying color. This last-named stream is delivered at a constant flowrate, and is deposited in groove 41, the stream flow being synchronized with movement of the grooved blank 40. As before, the resin is thereafter hardened and shaped to provide a constant depth band 35.

The color wheel blank 40 (FIG. 5) is advantageously made of a transparent synthetic organic resin that is compatible with the resin used for band 35 (FIG. 3), so that the two form a monolithic, inseparable structure. The acrylic resins, particularly methylmethacrylate, are particularly preferred by reason of their transparency and their excellent mechanical properties. Blank 40 typically has dimensions of 3½" in diameter, ¼" thick, and is provided with a groove 41 that is about ⅛" deep and ⅝" wide.

Irrespective of whether the incremental pouring or the continuous pouring technique is used to prepare color wheel 20, it is first necessary to formulate a solution of casting resin dyes which, when mixed with the casting resin, will have a color corresponding with a sample solution of known pH containing an indicator.

The initial step in formulating colored casting resins is the preparation of liquid samples of known pH, containing a constant and predetermined amount of one or more indicators. For purposes of illustration, instructions will be given for preparing a color comparator standard for use with brome thymol blue pH indicator, although it will be appreciated that the same technique may be employed with other indicators or with mixtures of two or more indicators, as discussed earlier.

Two samples of known pH are then prepared, for example one at pH 6.0 when the brome thymol blue indicator is yellow and the other at pH 8.5 when it is deep blue. These solutions are separately analyzed by a spectrophotometer, and adsorption curves are made over the entire spectrum. Then, by trial and error, a standard dye, or mixture of standard dyes, from among the commercially available casting resin dyes is selected to produce a casting resin solution whose absorption curve closely matches the absorption curve of each of the two known samples. This is most easily done by preparing beforehand absorption curves of selected concentrations of a great number of suitable dyes. By reviewing the file of curves, it is a relatively simple matter to select the dye or dyes most likely to produce the desired color.

In the example under discussion, it is found that the color of a brome thymol blue solution at pH 6.0, viewed through a 1.0" tube, can be closely color matched (as to hue, value, and chroma) by a 1/8" thickness of methylmethacrylate casting resin containing 0.0082% of Irgacet Yellow GL and 0.000064% of Solvent Rubine 3 D. At pH 8.5, the brome thymol blue indicator has a color which, through a 1.0" tube, corresponds with a 1/8" thickness of methylmethacrylate resin containing 0.006% Oil Fast Blue R and 0.0048% of Irgacet Brilliant Blue 2 GLN.

Each of the resins is separately formulated by adding the respective dyes and a polymerization catalyst to methylmethacrylate monomer, and heating the mixtures until partial polymerization occurs to an extent such that the solutions are syrupy yet remain sufficiently fluid that they may be poured or pumped. Various catalysts are useful for the polymerization and the peroxide catalysts such as benzoyl peroxide or the azo catalysts such as azobisisobutyronitrile may be used, the concentration in either case being about 0.5 weight percent on resin.

The several resin compositions used in a given color wheel will of course depend on the type of unknown undergoing test and on the type of indicator used. It is however necessary to provide at least two resins of different composition, that is, color, although in particular circumstances one of the resins may be colorless. Accordingly, the term "color," as used herein, unless otherwise stated, is intended to embrace a completely transparent resin. An example of the use of two resins where one is transparent is in preparing a disk for the colorimetric analysis of water for chlorine using an orthotolidine indicator; in this case a concentration of 1.0 p.p.m. chlorine in a 1.0" test tube will have the same color as a 1/8" thickness of methylmethacrylate containing 0.0074% Amplast Yellow G, while a null concentration will be as transparent as uncolored polymethylmethacrylate.

As earlier stated, two different methods of manufacture may be used to produce the color wheels of the invention. The first method, as depicted in FIGS. 7 and 8, entails the depositing of discrete increments of two or more different colored resins in groove 41 (FIG. 6), followed by mixing the increments to form a band 30 of continuously varying color. As typified by FIG. 7, five batches, 35a through 35E, of differently colored resins are deposited at spaced locations in groove 41; five such resins are needed for a wide range pH indicator suitable for pH readings between 4 and 10. The five resins have each been colored to correspond with the hue, value, and chroma of five preselected samples of known pH, one at pH 4.0, another at pH 10.0, and the remaining three at spaced-apart pH's between 4.0 and 10.0. Each of the resins is a viscous partially polymerized solution fo polymethylmethacrylate, which has been cooled after partial polymerization to halt further polymerization.

Turning now to FIG. 8, the blank 40 is placed face up on a turntable, not shown, and mixer 60 is lowered into position with its blades 64 and 65 within groove 41 and immersed in the syrupy resin. It will be observed from this figure that mixer 60 is provided with a pair of counter-rotating shafts 66 and 68, each terminating in arm 61 and 62, respectively, at the ends of which are the blades 64 and 65. The axes of shafts 66 and 68 are in a plane aligned along a radius of blank 40 so that more of the mixing occurs by movement of the resin in a direction transverse to the length of groove 41 than in a direction longitudinal of the groove.

Counter-rotation of shafts 66 and 68 is accomplished by providing a pair of gears 69 and 70 mounted on the shafts, and by driving only one of the shafts, specifically, 66. Gears 69 and 70 are enclosed within housing 71.

Mixer 60 is then moved along groove 41, or vice versa, in order to effect mixing between adjacent batches 35a–35e (FIG. 7) and thereby form a band of continuously varying color.

Alternatively, the system of FIGS. 9 and 10 may be employed to provide a band of continuously varying color. In this embodiment five batches of resins of different color are prepared as before, but instead of adding the batches as separate increments to groove 41 of block 40, the resins are formed into streams and blended continuously, but in continuously varying proportions, and the resultant stream poured into the groove.

Referring to FIG. 9, blank 40 of color wheel 20 is placed on turntable 72, and is centered with a central pin 74 passing through pivot hole 33. A series of three clamps, shown schematically at 75, locks color wheel 20 onto the turntable, which is driven via shaft 76 coupled via schematic shaft 77 to motor M. Motor M also drives, in synchronization, schematic shaft 78 which in turn is coupled to cam shaft 79.

Each of the five colored casting resins is transferred from a tank, not shown, via conduit 80 and check valve 81 to one of the cam-driven piston pumps 82.

Pumps 82 each comprise an external cylinder 84 and a spring-biased piston 85 which is driven inwardly of the cylinder 84 by cam 86 fixed to cam shaft 79.

The discharge from pump 82 flows through conduit 88, check valve 89, solenoid valve 90, and conduit 91 to mixing head 92, which will be described presently.

Returning to piston pump 82, it was noted that each pump is provided with a separate cam 86. These cams are so designed that they will deliver varying amounts of resin from each of the pumps 82, 82b, 82c, 82d, and 82e, but the total flowrate from all of the pumps is constant. (For simplicity, the connecting piping from each of the pumps 82b through 82e extending to mixing head 92 has been omitted from the drawing. It will be understood however that each of the respective pump discharge lines communicates with mixing head 92.)

The streams from each of the pumps 82 through 82e commingle in mixing head 92, best sown in FIG. 10. There it is seen that conduits 91, 91c, etc., are threadedly received into threaded ports 93 leading to a mixing chamber 95 having cylindrical sides and a frustoconical lower portion, and wherein rotary paddle mixer 96 is disposed. Mixer 96 is connected via shaft 98 to an external motor, not shown. The mixer itself has two eccentric blades or paddles, 99 and 100 to effect rapid mixing of the viscous resin streams entering through conduits 91, 91c, etc., and for discharging them rapidly as a single mixed stream via conduit 101 located at the bottom of the lower frustoconical portion of mixing chamber 95. For repair or replacement, mixer 92 may be disassembled by removing the top portion 102, normally secured to the lower portion 104 via cap screws, not shown.

Returning to FIG. 9, the mixed stream from conduit 101 is deposited into groove 41 of block 40 while turntable 72 rotates in synchronization with cam shaft 79. Thus, one rotation of turntable 72 corresponds to one complete cycle of cam shaft 79, during which the several resins are proportionately mixed and discharged to fill the groove 41.

Whether made by the method and apparatus indicated in FIGS. 7 and 8 or those in FIGS. 9 and 10, it is then necessary to harden the colored resin, which is ordinarily accomplished by heating the color wheel 20 to a sufficient temperature to permit the polymerization reaction to proceed to completion. The wheel or disk is then cooled and the top surface polished flat.

It will be readily apparent that the color comparator 10 is an economical and easily used instrument. The color wheel 20 may be manufactured easily and reproducibly, particularly once the proper dye concentrations have been determined. The smoothly graded color bands produce an exceptional ready accuracy, normally within a few percent of the full scale of a wheel. This of course is in substantial contrast to the accuracies achieved by comparators having spaced windows, and approaches the accuracy of expensive electric or electronic pH meters. Furthermore, interpolation is relatively simple inasmuch as peripheral distances along the band are approximately linear with pH.

I claim as my invention:

1. A transparent color-comparator standard for use with color comparators for relating the color of an indicator in a sample with the concentration of a substance in said sample, comprising a body of transparent material having therein a flat-bottomed constant depth groove of uniform width, said groove containing an integral strip of hardened, transparent resin having a hue that varies continuously along said groove said strip having a constant depth and uniform width.

2. The color-comparator standard of claim 1 having calibration marks to correspond with a predetermined color relationship.

3. The color-comparator standard of claim 1 in the form of a circular disk of organic resin compatible with said hardened transparent resin, said groove being along the periphery of one face of said disk, and having a central pivot hole.

4. A transparent color-comparator standard for use with color comparators for relating the color of an indicator in a sample with the concentration of a substance in said sample, comprising a body of transparent material having therein a flat-bottomed constant depth groove of uniform width, said groove containing an integral strip of hardened, transparent resin having a color value that varies continuously along said groove said strip having a constant depth and uniform width.

5. The color-comparator standard of claim 4 having calibration marks to correspond with a predetermined color relationship.

6. The color-comparator standard of claim 4 in the form of a circular disk of organic resin compatible with said hardened transparent resin, said groove being along the periphery of one face of said disk, and having a central pivot hole.

7. A transparent color-comparator standard for use with color comparators for relating the color of an indicator in a sample with the concentration of a substance in said sample, comprising a body of transparent material having therein a flat-bottomed constant depth groove of uniform width, said groove containing an integral strip of hardened, transparent resin having a chroma that varies continuously along said groove said strip having a constant depth and uniform width.

8. The color-comparator standard of claim 7 having calibartion marks to correspond with a predetermined color relationship.

9. The color-comparator standard of claim 7 in the form of a circular disk of organic resin compatible with said hardened transparent resin, said groove being along the periphery of one face of said disk, and having a central pivot hole.

References Cited

UNITED STATES PATENTS

| 1,805,969 | 5/1931 | Bostrom | 351—165 X |
| 3,354,025 | 11/1967 | Aykanian et al. | 161—199 |
| 1,878,847 | 9/1932 | Hausser et al. | |
| 2,172,352 | 9/1939 | Allison | 95—5 |
| 2,916,968 | 12/1959 | Jackson | 350—314 |
| 2,850,941 | 9/1958 | Long. | |

FOREIGN PATENTS

| 1,092,544 | 4/1955 | France. |

RONALD L. WIBERT, Primary Examiner

R. T. WEBSTER, Assistant Examiner

U.S. Cl. X.R.

35—83.3; 350—314; 356—42